United States Patent [19]

Peters

[11] Patent Number: 4,588,382
[45] Date of Patent: May 13, 1986

[54] WIDE ANGLE AREA-OF-INTEREST VISUAL IMAGE PROJECTION SYSTEM

[75] Inventor: David L. Peters, Whitney Point, N.Y.

[73] Assignee: The Singer Company, Binghamton, N.Y.

[21] Appl. No.: 573,986

[22] Filed: Jan. 26, 1984

[51] Int. Cl.[4] ............................................. G09B 9/08
[52] U.S. Cl. .................................................... 434/44
[58] Field of Search ..................................... 434/43, 44

[56] References Cited

U.S. PATENT DOCUMENTS 4,131,345  12/1978  Carollo .................................. 434/44
4,439,157  3/1984  Breglia et al. ......................... 434/44

Primary Examiner—Richard C. Pinkham
Assistant Examiner—Leo P. Picard
Attorney, Agent, or Firm—Barry L. Haley

[57] ABSTRACT

An improved multiple channel, wide-angle visual image projection system producing a movable displayed image. The system permits the use of two or more light projectors for high resolution wide-angle image display while eliminating image abutment and alignment problems. The system forms a composite image from two or more projectors in a strategically aligned prism array, the composite image being optically transferred to a single wide-angle projection lens, gimballed in azimuth and elevation, through a pair of movable servo-driven prisms for projection onto a two-dimensional screen. The projection system is especially suited for use in an area-of-interest, helmet-slaved visual display in a flight simulator.

11 Claims, 8 Drawing Figures

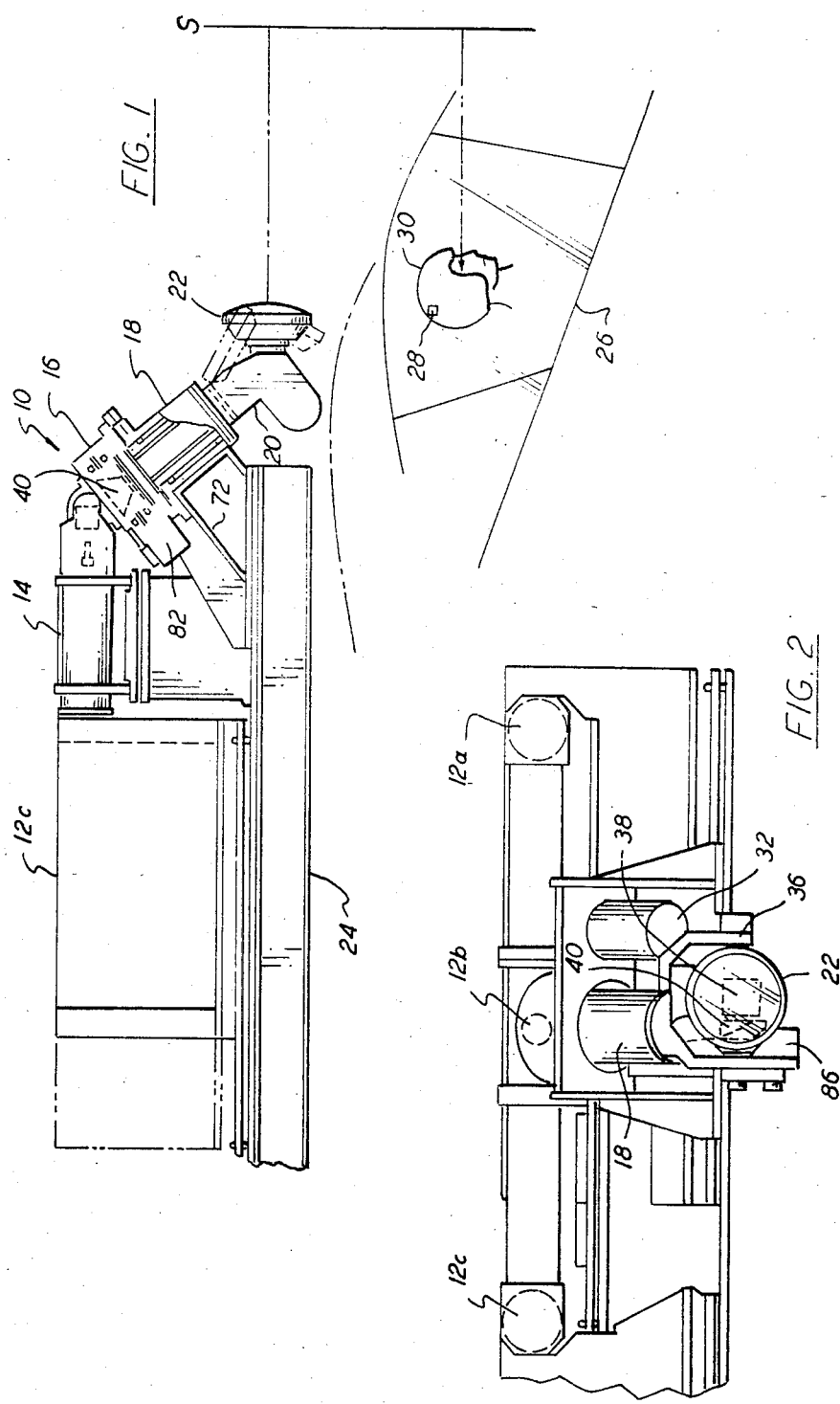

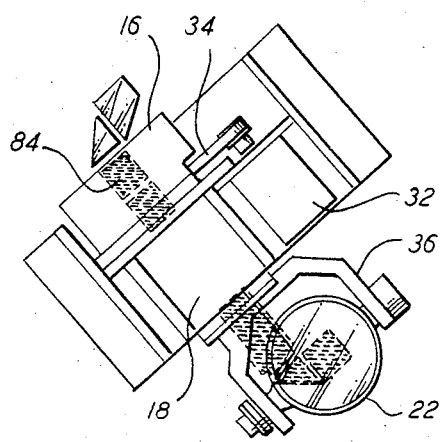
FIG. 3
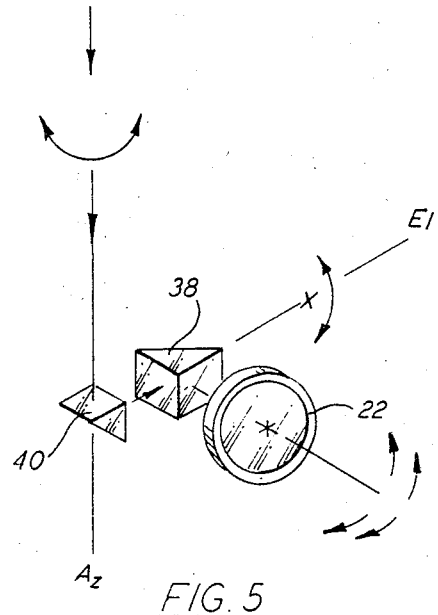
FIG. 5
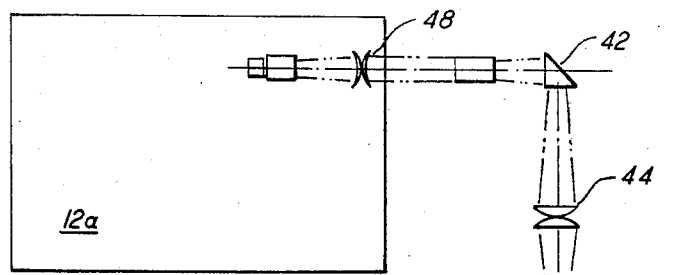
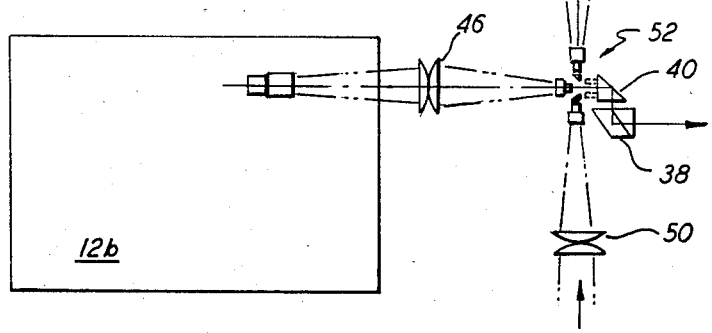
FIG. 4

WIDE ANGLE AREA-OF-INTEREST VISUAL IMAGE PROJECTION SYSTEM

TECHNICAL FIELD

The present invention relates to the field of visual image projection systems and, in particular, to a helmet-slaved, area-of-interest projection system employing multiple light projectors that permits rapid but accurate movement in azimuth and elevation of a projected image over a wide field of view.

BACKGROUND ART

In flight simulator visual systems, a wide (especially horizontal) operator field-of-view is desirous for realism. Typically in present day systems, computers provide the image generation. In order to cost effectively utilize the computer image generator to its compacity for maximum realism, area-ofinterest systems have been developed. In such systems, only an instantaneous field-of-view is presented to the operator, eliminating image generation by the computer in those areas not instantly viewable by the operator. One such area-of-interest system is shown in U.S. Pat. No. 4,103,435 issued Aug. 1, 1978 to Herndon. The location of the displayed image is aligned with the operator's instantaneous field of view through sensors mounted on a helmet worn by the operator so that regardless what direction the operator is facing relative to the display screen, an image sufficient to encompass the operator's instantaneous field-of-view is projected.

Although the helmet-slaved, area-of-interest system does allow cost effective computer utilization for image generation, such a system creates problems with respect to image projection and display for a wide angle field-of-view. In order to ensure a resultant display image of sufficient intensity and resolution over the total wide field of view (e.g. 235° azimuth), multiple light projectors are necessary. The use of two or more light projectors individually moveable in response to operator induced helmet movement creates critical image abutment and alignment problems that must be resolved for display realism. Another problem associated with multiple light projectors is distortion which results from physical location of each projector exit pupil relative to the display screen (typically a concave spherical dome). Ideally, each projector exit pupil would be placed at the radius of curvature of the dome, which is not physically possible. Thus it is necessary to correct for distortion of each projector image, thereby increasing the overall complexity of the projection system.

In an attempt to reduce the projection problems stated above, Spooner in U.S. Pat. No. 4,048,653 utilized a helmet-mounted binocular viewer, while Harvey in U.S. Pat. No. 4,348,186 employs a helmet-mounted projector. Because neither of these types of devices are present in the actual pilot/cockpit environment, realism is sacrificed.

The invention described and claimed herein provides a helmet-slaved, area-of-interest visual system having a wide total field of view (280° azimuth; ±75° elevation) that gives maximum utilization of computer image capability in conjunction with two or more light sources for enhanced intensity and resolution in the displayed image while eliminating image abutment and distortion problems.

DISCLOSURE OF THE INVENTION

A light projection system, especially suitable for an area-of-interest, helmet-slaved visual system for a flight simulator having improved tracking and display capabilities.

The projection system includes multiple image projectors from which the images are joined before optical projection through a single, movable high-resolution gimballed lens. The optical components that combine and transfer the image from the projectors to the movable lens includes strategically aligned, independently movable prisms that cooperate with the gimballed projection lense to permit rapid, but accurate positioning of the image in azimuth and elevation. Preferably, a large concave spherically-shaped dome is used as the display screen.

The basic elements of the overall visual system as would be employed in a flight simulator include a head (helmet) position and attitude sensing device, slewable image generation and image projection devices, software interfaces which monitor and control them, and a dome-shaped screen.

The overall system is comprised of a computer-image generator, two or more light projectors, operator head movement detector (usually mounted on a helment worn by the operator), a combining optics module that combines the image from two or more projectors into a single optical chain, a high-resolution gimballed servo-driven projection lens movable in azimuth and elevation, and a projection screen, preferably shaped as a concave segment of a dome.

The improvement provided by this invention resides in the image projection system, and specifically in the projection optical system. The images from two or more projectors are combined optically to form a single composite image which is fed as an input to the optical projection system. The optical path for the composite image is folded about two axes to allow the projected composite image to be moved both in azimuth and elevation about the projection screen, providing a wide angle total field-of-view. Servo motors are employed to direct the projected image about the field-of-view corresponding to movement of the operator's head.

The system provides a movable visual iamge that constitutes an instantaneous operator field-of-view, the image being formed from two or more separate projectors.

Head motion sensing is accomplished with the operator wearing a helmet that includes a position and attitude sensor with feedback to a computation system. Because the helmet itself limits the operator's instantaneous field-of-view to 180°, this value is selected for the system herein disclosed.

The digital image generator employed herein is conventional in design and does not itself form part of the invention. Sodern light projectors create the visual images and have internal optics that permit light modulated by Titus tubes to be transmitted to the light valve relay lens. This lens forms an image of the Titus tube at the field lens.

Operationally, the image from each projector is positioned at a predetermined location to provide the formation of a single composite image in a desired image plane. Reflecting prisms may be used for the composite image formation.

Each image can be aligned and properly abutted relative to each other at this location in the projection system. The composite image is then passed through a roll compensating mechanism, and first and second moveable reflectors that act in conjunction with the projection lens to permit movement of the composite image in azimuth and elevation. Servo mechanisms that drive the system in azimuth and elevation require signals from the computational sections of the system that receives signals from the helmet position and attitude sensors so that the resultant projected composite image is displayed as the operator's instantaneous field-of-view.

The azimuth and elevation gimbal assembly provides for two degrees of rotational freedom of the projected image by two 90° deflections, preferably through two right angled, internally reflective prisms, one prism being movable relative to the other to permit azimuth and elevational movement of the projection lens.

It is an object of this invention to provide an improved visual display system employing multiple light projectors that permits rapid yet accurate movement of the resultant image in azimuth and elevation.

It is another object of this invention to provide an improved wide angle, area-of-interest visual system for a flight simulator employing multiple light projectors.

And yet another object of the invention is to provide a light projection system for a visual display having a high intensity image of high resolution that is moveable about a screen, and that is formed from two or more image projectors.

BRIEF DESCRIPTION OF THE DRAWINGS

FIG. 1 is a side elevational view of the present invention;

FIG. 2 is a front elevational view of the present invention;

FIG. 3 is a front elevational view of a portion of the present invention showing the optical path in phantom;

FIG. 4 is a top plan view schematically representing the projectors and a portion of the light path employed in the present invention.

FIG. 5 is an orthogonal view showing schematically the relationship of certain reflecting prisms and a projection lens and their rotational axes as used in the present invention;

BEST MODE FOR CARRYING OUT THE INVENTION

Figure 6:
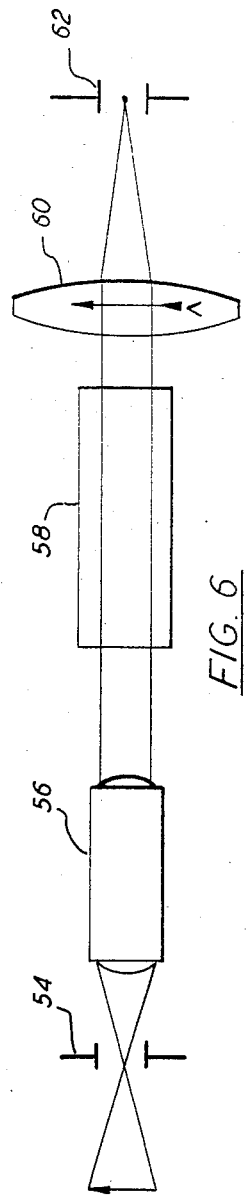
FIG. 6 shows the combining optical path of the present invention in a block diagram.

Referring now to the drawings and, in particular, FIG. 1, the invention is shown generally at 10 mounted on support frame member 72 rigidly connected to platform 24. A wide-angle projection lens 22 is gimballed in two axes to permit positioning of a projected image approximately 60 degrees up and 15 degrees down in elevation and ±50 degrees in azimuth as viewed from the center of curvature of a spherical screens. The operator is seated in a simulated aircraft cockpit 26 located near projector 10 facing the spherical screen. Any visual distortion in the resultant projected image caused by the difference between the location of the operator's eyes and the projection lens 22 relative to the screen is corrected in the image generator. The operator's helmet 30 includes a sensor 28 that provides position and attitude information of the helmet to the computational elements of the simulator (not shown) to produce signals for driving the azimuth and elevation servo mechanisms that position projection lens 22 relative to the screen so that the image projected from lens 22 corresponds to the instantaneous field of view of the operator. The helmet sensor must monitor head position parallax correction as well as head-slaving the projection lens. Either of two head sensing devices may be used for this purpose. The two systems are: (1) the M136 Helmet Mounted Sight helmet sensor used in the U.S. Government, and (2) the Magnetic Helmet-Mounted Sight System head sensor manufactured by Honeywell Corporation.

The primary mechanical subsystems of the invention include three light projectors (only 12c is visible in FIG. 1), an optical format combining module 14, a roll prism servo assembly 16, and an azimuth and elevation gimbal assembly 20 movably connected to housing 18.

Three Sodern light projectors 12a, 12b, and 12c are provided (only two shown in FIG. 4). Each Sodern projector has internal optics which polarize and focus light on the Titus tube from a zenon arc lamp. A polarizing combining prism permits the light modulated by the Titus tube to be transmitted to the light valve relay lens. Each projector receives video and deflection signals from the video processing electronics and the digital image generator. The particular system for the image generation is a matter of design choice and does not constitute part of the invention. The light path from each projector is folded by lenses 44, 46, 48, 50 in conjunction with positioning prisms such as 42 so that the light paths converge at 52, the entrance to the optical format combining modular 14 (FIG. 1).

Figure 7B:
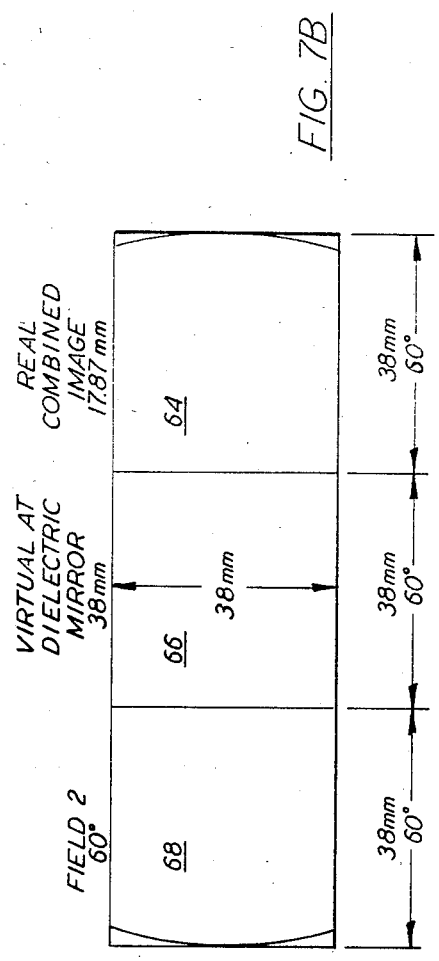
FIG. 7B shows a front elevational view showing the abutted combination of images and their representative sizes.
Figure 7A:
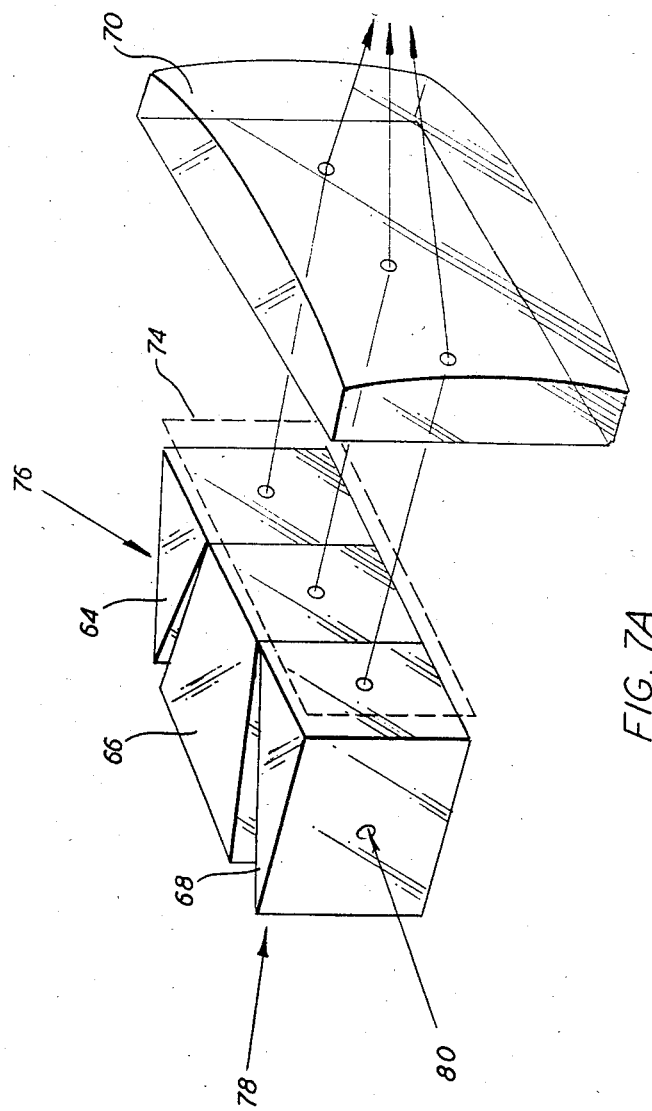
FIG. 7A shows a perspective view of the combining module for combining multiple images as employed in the present invention.

FIGS. 6, 7A, and 7B show the optical combining module comprising an entrance pupil 54, a reduction lens 56, combining prism or glass block 58 (elements 64, 66, and 68 of FIG. 7A), field lens 60, and pupil 62. Light valve inputs 76, 78, and 80 from the Sodern projectors are received into prism 64 and 68, and glass block 66. The three light valve images are abutted to form a composite image 74. The pupils are still collimated at this point and appear coaxial since their axes are displaced by a finite amount, but the apparent distance is infinity. Field lens 60 decollimates the pupils and forms a real image of each. These images will be superimposed on each other. After the optical combining module 14, the image is relayed into the axial lens assembly which takes the image through the gimbal system to the wide-angle projection system.

Referring to FIG. 1, the axial lens system includes a roll prism servo assembly within housing 16 and azimuth and elevation gimbal assembly 20 which is rotatably connected to housing 18.

The servo relay lens assembly 40 is comprised of a Pechan rotation prism and relay optics. The rotation prism provides dynamically correct orientation of the image to be projected. This is required since the gimballed projection lens assembly rotates the image as it moves. The roll drive support structure 16 includes a roll drive motor 82, a belt drive, optical encoder, and a toothed pulley. The optical encoder provides position feedback.

The image is relayed through prisms 38 and 40 in the azimuth and elevational gimbal assembly 20 to the wide-angle projection lens 22. The lens channel 84 corresponds to the azimuth azis of the projection system. FIG. 5 shows schematically the operation of gimballed prisms 38, 40, and the wide-angled projection lens 22. Rotation about the azimuth axis to effect azimuth movement of the projected image on the display screen is achieved by movement from the azimuth servo system that rotates element 20 (FIG. 1); prism 40, prism 38, and lens 22 move together. Rotation about the elevation axis to effect elevational movement of the projected image on the display screen is achieved by movement of prism 38 and lens 22 about the elevational axis relative to prism 40, by action of the elevation drive motor 86.

As shown in FIG. 7B, the composite image is sized to provide 180° in azimuth, the maximum instantaneous field-of-view of an observer with a helmet.

For use in a flight simulator, the observer in FIG. 1 wears a helmet 30 having a position and attitude sensor 28 that supplies positional information to the computational elements of the simulator such that the projection lens 22 can be driven in azimuth and elevation so that the projected image corresponds with the instantaneous field-of-view of the observer.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

What I claim as my invention is:

1. A wide angle visual image projection system, for use in a visual display including a display screen, that permits two dimensional movement of projected abutting images generated in different light projectors comprising:
    at least two light projectors, each providing a light image that constitutes a particular abutting portion of the final image to be displayed;
    means for generating visual images connected to said projectors;
    first optical means for optically abutting each image from each projector into a single composite image;
    a wide angle projection lens;
    second optical means for transferring said composite image from said first optical means to said projection lens; and
    means for moving the image projected from said projection lens in azimuth and elevation.

2. A projection system as in claim 1, wherein:
    said display screen for displaying the composite image from the projection lens having a predetermined radius of curvature; said projection lens being positioned at the center of the screen radius of curvature.

3. A projection system as in claim 1 for a head-slaved visual system in a flight simulator including:
    a display screen;
    means for sensing the position and attitude of a trainee's head connected to said means for moving said projection lens in order to determine the location of the instantaneous field-of-view of said trainee on said display screen;
    said means for moving said projection lens being in correspondence with the movement of the trainee's head so that the image projected by the projection lens is observed by the trainee as the instantaneous field-of-view.

4. A projection system as in claim 1, wherein said second optical means includes:
    means for relaying the composite image along the azimuthal axis to the projection lens;
    means for relaying the composite image along the elevational axis to the projection lens; and
    means for compensating the roll angle of image roll induced by movement of the composite image in azimuth and elevation.

5. A visual image projection system for visually displaying a wide angle field-of-view for an observer by moving the projected image constituting the instantaneous field-of-view of the observer about a two-dimensional screen comprising:
    at least two light projectors, each providing a separate image that constitutes a particular abutting portion of the final image to be displayed;
    means for optically abutting the images from each projector into a composite visual image;
    wide angle projection lens;
    means for optically transferring the composite image to said wide angle projection lens; and
    means connected to said optical transfer means and said wide angle projection lens for moving said projected composite image about said screen.

6. A projection system as in claim 5 wherein said projector means includes:
    means for providing two degrees of rotational freedom of said composite image.

7. A projection system as in claim 6, including:
    means for gimballing the projection lens in azimuth and elevation; and
    servo motor means connected to said projection lens for moving said projection lens in azimuth and elevation.

8. A wide-angle visual image image projection system for providing a high-intensity visual image positionable in azimuth and elevation relative to a predetermined point on a display screen comprising:
    at least two light projectors, each providing a separate visual image that comprises a segment of the final image to be displayed;
    means for abutting the images from said projectors into a single composite image;
    azimuth gimbal;
    elevation gimbal;
    projection lens mounted on said azimuth gimbal and said elevation gimbal to permit movement of said projection lens in azimuth and elevation; and
    optical relay means for relaying said composite image along the azimuthal and elevational axes of said gimbals to said projection lens.

9. A wide-angle projection system as in claim 8, wherein:
    said optical relay means includes first and second image reflecting means aligned to relay the composite image from the image abuttment means, along the azimuthal axis of the azimuthal gimbal, along the elevational axes of the elevation axis to the projection lens.

10. A wide-angle projection system as in claim 9, including:
    composite image roll compensating means optically coupled to said optical relay means to compensate for image rotation caused by relative movement between the azimuth and the elevation gimbal.

11. A wide-angle projection system as in claim 10, wherein:
    said first and second reflecting means are internally reflective right angle prisms.

* * * * *